United States Patent [19]
Kim

[11] Patent Number: 5,996,368
[45] Date of Patent: Dec. 7, 1999

[54] AIR CONDITIONING APPARATUS

[75] Inventor: Kyung Sik Kim, Inchon, Rep. of Korea

[73] Assignee: LG Electronics, Inc., Rep. of Korea

[21] Appl. No.: 08/940,256

[22] Filed: Sep. 30, 1997

[30] Foreign Application Priority Data

Oct. 4, 1996 [KR] Rep. of Korea ............. 96-43864

[51] Int. Cl.⁶ ................. F25B 1/10; F25B 13/00
[52] U.S. Cl. ........................ 62/324.6; 62/510
[58] Field of Search ............ 62/510, 175, 324.6, 62/228.4 F; 236/1 EA

[56] References Cited

U.S. PATENT DOCUMENTS

| | | | |
|---|---|---|---|
| 3,668,883 | 6/1972 | Ruff et al. ............. | 62/228.4 X |
| 4,676,072 | 6/1987 | Higuchi ................. | 62/228.4 X |
| 5,381,671 | 1/1995 | Saito et al. ............ | 62/510 X |
| 5,490,399 | 2/1996 | Sada ..................... | 62/510 |
| 5,778,692 | 7/1998 | Gura ..................... | 62/175 |

FOREIGN PATENT DOCUMENTS 2223607   11/1990   United Kingdom ......... 62/228.4

*Primary Examiner*—William Wayner
*Attorney, Agent, or Firm*—Ostrolenk, Faber, Gerb & Soffen, LLP

[57] ABSTRACT

An air conditioning apparatus includes a first, second and third internal devices, and an external device which is provided with a plurality of separately operable units. Each of the units comprises an inverter compressor for compressing a refrigerant under a high temperature and a high pressure, a first heat exchanger, a four-directional valve for sending the refrigerant to the external heat exchanger during a cooling operation and being closed/opened so as to discharge the refrigerant into each of the internal devices during a heating operation, a check valve for switching on/off the flow of the refrigerant which was compressed after being heat-exchanged in the external heat exchanger, a pair of electronic expansion valves for depressurizing the refrigerant respectively, an electronic expansion valve applied to heating and for further depressurizing the temperature-lowered refrigerant which was depressurized in the expansion valves, and an accumulator between the compressor and the four-directional valve and for temporarily storing therein the refrigerant in each step of the cooling and heating operation.

2 Claims, 2 Drawing Sheets

\# AIR CONDITIONING APPARATUS

BACKGROUND OF THE INVENTION

1. Field of the Invention

The present invention relates to an air conditioner, and more particularly to an improved air conditioning apparatus capable of enhancing performance thereof by furnishing a plurality of independently operable units in an external device collectively connected to one or more internal devices of the air conditioning apparatus.

2. Description of the Prior Art

In general, there are two types of air conditioners: a single body type comprising; a compressor, a condenser, a heat exchanger, etc.; and a partitioned type divided into internal devices comprising a compressor, a condenser, etc., and an external device comprising a heat exchanger, etc.

FIG. 1 is a schematic composition view illustrating a conventional partitioned air conditioning apparatus. As shown therein, an air conditioning apparatus 20 is provided with a first, second and third internal devices 1, 2, 3 and an external device 4.

The external device 4 includes: an inverter compressor 5 for compressing a refrigerant under a high temperature and a high pressure; an external heat exchanger 6 for heat-exchanging the refrigerant; a multi-directional valve 7 for discharging the pressurized refrigerant received from the inverter compressor 5 to the external exchanger 6 during a cooling operation, and discharging the pressurized refrigerant to the internal devices 1, 2, 3 during a heating operation; a check valve 8 for opening or closing the flow path of a highly-pressurized and supercooling refrigerant which was heat-exchanged and pressurized in the external heat exchanger 6; a receiver 9 for storing therein the highly-pressurized and supercooling refrigerant that passed through the check valve 8 during the cooling operation, and the low pressure and high temperature refrigerant during the heating operation; a first, second and third electronic expansion valves 10, 11, 12 for converting the highly pressurized and supercooling refrigerant outputted from the receiver during the cooling operation into a depressurized refrigerant; an electronic expansion valve B for heating the low temperature and low pressure refrigerant from the receiver 9 during the heating operation; and an accumulator 14 for temporarily storing therein the low temperature and low pressure refrigerant which was heat-exchanged in the internal devices 1, 2, 3 during the cooling operation, and is heat-exchanged in the heat exchanger 6.

The thusly explained conventional air conditioner's operation and its disadvantages will now be described.

First, the flow of the refrigerant during the cooling operation, the refrigerant compressed under the high temperature and high pressure in the inverter compressor 5 flows into the heat exchanger 6 via the multi-directional valve 7 so as to be heat-exchanged with the external air. That is, the heat is externally discharged and accordingly the compressed refrigerant becomes condensed into the highly pressurized and supercooling refrigerant.

The highly pressurized and supercooling refrigerant flows from the external heat exchanger 6 through the check valve 8 to the receiver 9 for storage thereof.

The highly pressurized and supercooling refrigerant is coupled and flows into each of the electronic expansion valves 10, 11, 12.

After the highly pressurized and supercooling refrigerant flows into each of the electronic expansion valves 10, 11, 12 the refrigerant expands and is depressurized to a state of low temperature and low pressure thereof, and then flows from each of the expansion valves 10, 11, 12 to a corresponding one of the internal devices 1, 2, 3.

The low temperature and low pressure refrigerant which flows into each of the internal devices 1, 2, 3 absorbs the heat therearound and evaporates, and then the refrigerant flows into the accumulator 14 via the multi-directional valve 7 so as to be temporarily stored therein, and then again flows into the inverter compressor 5 and is compressed to the high temperature and high pressure refrigerant.

The flow of the refrigerant during the heating operation will now be described.

The high temperature and high pressure refrigerant compressed in the compressor 5 passes through the multi-directional value 7 and branches out and flows into the first, second and third internal devices 1, 2, 3, respectively.

Then, the compressed refrigerant flows and is heat-exchanged by radiating heat into a target room, and accordingly compressed into the supercooling refrigerant. Specifically, the supercooling refrigerant compressed in the first internal device 1 flows into the first electronic expansion valve 10 for cooling, the supercooling refrigerant compressed in the second internal device 2 flows into the second electronic expansion valve 11 for cooling; and, the supercooling refrigerant compressed in the third internal device 3 flows into the third electronic expansion valve 12 for cooling.

The highly pressurized and supercooling refrigerant flows into the electronic expansion valves 10, 11, 12, respectively, and are expanded and depressurized to the low temperature and low pressure refrigerant, and the resultant refrigerant accumulates in the receiver 9. Then, the refrigerant passes through the electronic expansion valve 13 for heating and then flows into the external heat exchanger 6 so as to be heat-exchanged with the external air. That is, the refrigerant in the heat exchanger 16 is evaporated.

The temperature-lowered and depressurized refrigerant which is discharged from the external heat exchanger 6, flows via the multi-directional valve 7 into the accumulator 14 and is temporarily stored therein, and then flows into the inverter compressor 5 for thereby being compressed under the high temperature and high pressure.

However, the conventional air conditioning apparatus has a disadvantage in that, the refrigerant should be appropriately and evenly distributed into each of the first, second and third internal devices 1, 2, 3 by use of the single inverter compressor, so that when the three internal devices are simultaneously operational, the internal devices may be lowered to as much as 80–90% capacity when compared to the initial capacity, thus the true product performance is low.

SUMMARY OF THE INVENTION

Accordingly, it is an object of the present invention to provide an air conditioning apparatus capable of enhancing performance thereof by furnishing a plurality of independently operating units in an external device and collectively connected in common to one or more internal devices of the air conditioning apparatus.

To achieve the above-described object, the air conditioning apparatus including a first, second and third internal devices, and an external device, and the external device is provided with a plurality of separately operable units.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

Figure 1:
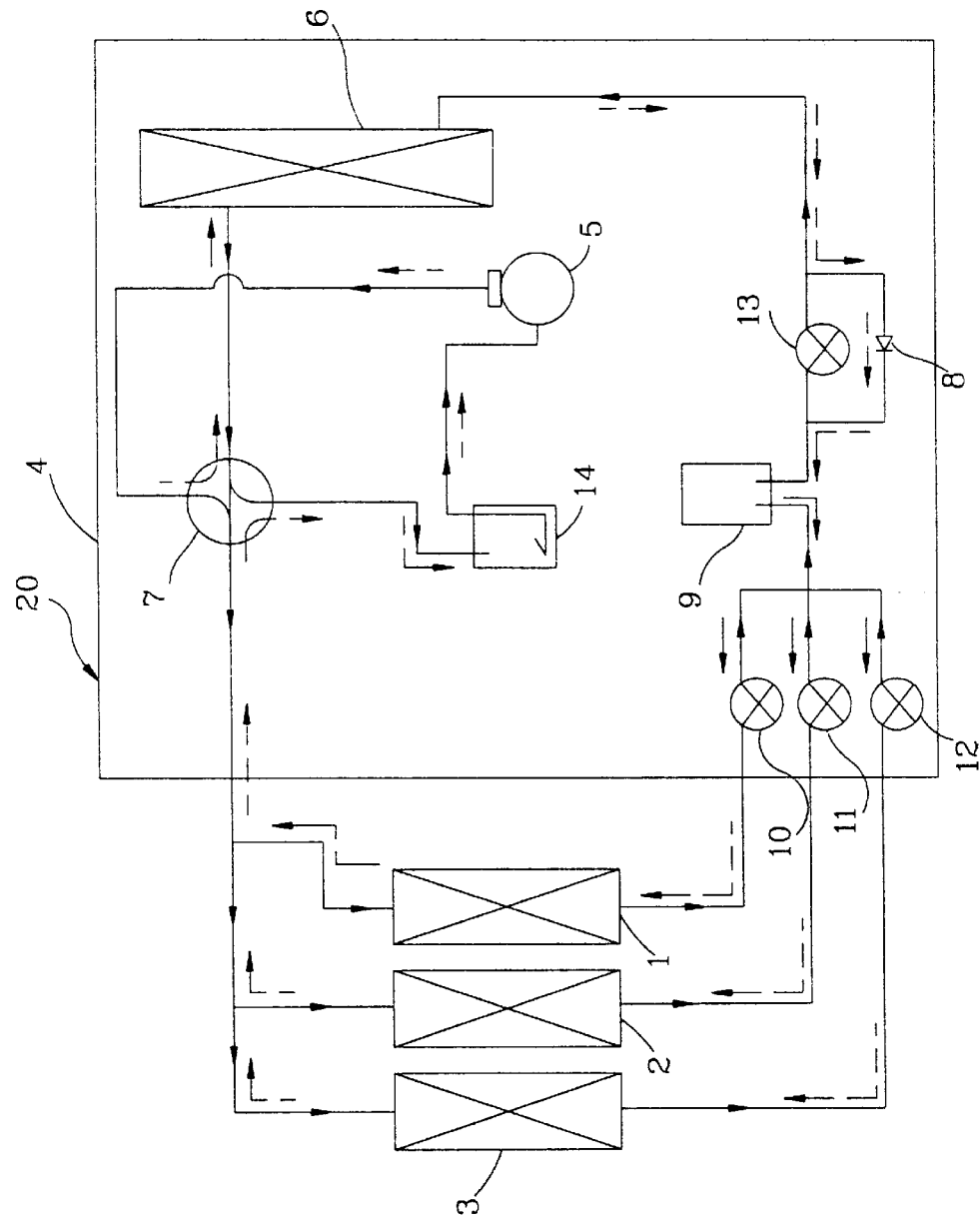
FIG. 1 is a schematic block diagram illustrating an air conditioning apparatus according to the conventional art.
Figure 2:
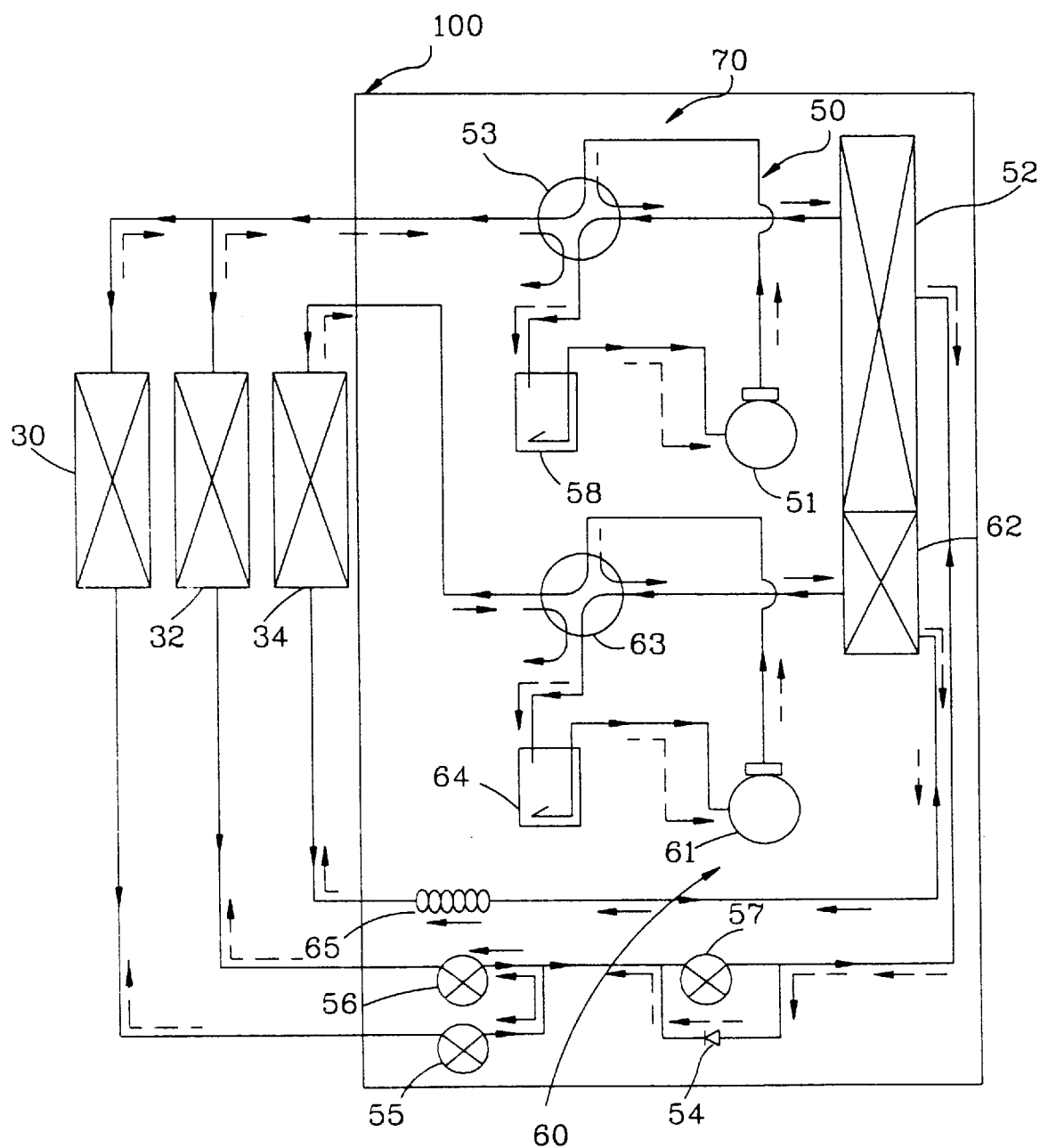
FIG. 2 is a schematic block diagram illustrating an air conditioning apparatus according to the present invention.

FIG. 2 illustrates an air conditioning apparatus according to the present invention. As shown therein, the air conditioning apparatus 100 includes a first, second and third internal devices 30, 32, 34, and an external device 70 having a first unit 50 and a second unit 60.

The first unit 50 in the external device 70 includes: an inverter compressor 51 for compressing a refrigerant under a high temperature and high pressure; a first heat exchanger 52 for heat-exchanging the refrigerant; a first four-directional valve 53 for sending the high-temperature and highly-pressurized refrigerant discharged from the inverter compressor 51 into a first external heat exchanger 52 during a cooling operation, and being closed/opened to facilitate the flow of the high-temperature and highly-pressurized refrigerant into each of the first and second internal devices 30, 31 respectively during a heating operation; a check valve 54 for switching on/off the flow of the highly-pressurized and supercooling refrigerant which was compressed after being heat-exchanged in the first external heat exchanger 52; a first and second electronic expansion valves 55, 56 for depressurizing the highly-pressurized and supercooling refrigerant compressed after being heat-exchanged in the first external heat exchanger 52 during the heating operation; an electronic expansion valve 57 for heating and to further depressurize the low temperature and low pressure refrigerant which was depressurized in the first and second electronic expansion valves 55, 56 for cooling; and a first accumulator 58 provided between the inverter compressor 51 and the first four-directional valve 53 and for temporarily storing therein, prior to being sent to the inverter compressor 51, the highly-pressurized and supercooling refrigerant heat-exchanged in the first and second internal devices 30, 32 during the cooling operation, and the highly-pressurized and supercooling refrigerant heat-exchanged in the first external heat exchanger 52 during the heating operation.

The second unit 60 in the external device 70 includes: an on/off compressor 61 for compressing the refrigerant under a high temperature and high pressure; a second external heat exchanger 62 for heat-exchanging the refrigerant; a second four-directional valve 63 for sending the high-temperature and highly-pressurized refrigerant compressed in and discharged from the on/off compressor 61 into the second external heat exchanger 62 during the cooling operation, and into the third internal device 34 during the heating operation; a second accumulator 64 provided between the on/off compressor 61 and the second four-directional valve 63 and for temporarily storing therein, prior to being sent to the on/off compressor 61, the highly-pressurized and supercooling refrigerant heat-exchanged in the third internal devices 34 during the cooling operation, and the highly-pressurized and supercooling refrigerant heat-exchanged in the second external heat exchanger 62 during the heating operation; and a capillary 65 for pressure-reducing the highly-pressurized and supercooling refrigerant which was compressed after being heat-exchanged in the second external heat exchanger 62 to a temperature-lowered and depressurized refrigerant.

The operation and effects of the thusly constituted air conditioning apparatus according to the present invention will now be described.

With regard to the flow of the refrigerant through the first unit 50 during the cooling operation, the refrigerant compressed under the high temperature and high pressure in the inverter compressor 51 flows through the first four-directional valve 53 into the first external heat exchanger 52, and the refrigerant which flows into the first external heat exchanger 52 is compressed to a supercooling refrigerant by being heat-exchanged with the external air.

The refrigerant compressed under the high pressure is discharged from the first external heat exchanger 52 and flows into the check valve 54. The highly pressurized and supercooling refrigerant that passed through the check valve 54 branches and flows into each of the first and second electronic expansion valve 55, 56, respectively for cooling.

The highly pressurized and supercooling refrigerant that flows into each of the first and second electronic expansion valve 55, 56 is expanded and becomes a temperature-lowered and depressurized refrigerant, whereby the temperature-lowered and depressurized refrigerant in the first electronic expansion valve 55 flows into the first internal device 30, and the temperature-lowered and depressurized refrigerant in the second electronic expansion valve 56 flows into the second internal device 32.

The temperature-lowered and depressurized refrigerant flows into the first and second electronic expansion valve 55, 56 is heat-exchanged by sucking heat in the target room and evaporated to a temperature-lowered and depressurized refrigerant.

Then, the temperature-lowered and depressurized refrigerant heat-exchanged in the internal devices 30, 32 and saturated accordingly flows into the first accumulator 58 through the first four-directional valve 53 to be temporarily stored therein and then into the inverter compressor 51, for thereby being compressed to the high temperature and high pressure refrigerant.

The flow of the refrigerant in the second unit 60 will be explained hereunder.

The refrigerant compressed in the on/off compressor 61 under the high temperature and high pressure flows through the second four-directional valve 63 into the second external heat exchanger 62, and the high temperature and high pressure refrigerant discharges its heat to the external environment and is compressed into a temperature-raised and supercooling refrigerant.

The temperature-raised and supercooling refrigerant is discharged from the second heat exchanger 62 and flows into the capillary 65, and the temperature-raised and supercooling refrigerant that flows into the capillary 65 is depressurized by a capillary action into the temperature-lowered and depressurized refrigerant.

The temperature-lowered and depressurized refrigerant flows into the third internal device 34, heat-exchanged by sucking heat in the target room, and saturated with the temperature-lowered and depressurized refrigerant.

Here, the temperature-lowered and depressurized refrigerant flows through the second four-directional valve 63 into the second accumulator 64, and temporarily stored therein, and then flows into the on/off compressor 61, for thereby being compressed to the high temperature and high pressure refrigerant.

The flow of the refrigerant in the respective units during the heating operation will now be described.

First, with regard to the flow of the refrigerant in the first unit 51, the refrigerant compressed under the high temperature and high pressure in the inverter compressor 51 branches and flows into each of the first and second internal devices 30, 32.

The high temperature and high pressure refrigerant is heat-exchanged by discharging its heat into the target room and accordingly compressed to the highly-pressurized and supercooling refrigerant, whereby the highly-pressurized and supercooling refrigerant flows into the first internal device 30 and flows into the first electronic expansion valve 55 which is applied to cooling, and the highly-pressurized and supercooling refrigerant flows into the second internal device 32 and then flows into the second electronic expansion valve 56 for cooling, for thereby being depressurized to the temperature-lowered and depressurized refrigerant.

The temperature-lowered and depressurized refrigerant depressurized in each of the first and second electronic expansion valves 55, 56 which are respectively applied to cooling, flows into the electronic expansion valves 57 which for heating, and further depressurized therein, and then flows into the first external heat exchanger 52.

Then, the temperature-lowered and depressurized refrigerant flows into the first external heat exchanger 52 is heat-exchanged by sucking heat from the external environment, and evaporated to the temperature-lowered and depressurized refrigerant. The evaporated temperature-lowered and depressurized refrigerant flows through the first four-directional valve 53 into the first accumulator 58 and temporarily stored therein and then into the inverter compressor 51, for thereby being compressed into the temperature-raised and highly pressurized refrigerant.

Next, the flow of the refrigerant in the second unit 60 will be described.

The refrigerant compressed in the on/off compressor 61 under the high temperature and high pressure flows through the second four-directional valve 63 into the third internal device 34, and the temperature-raised and highly-pressurized refrigerant flows into the third internal device 34 and is heat-exchanged by discharging heat to the target room and accordingly compressed to the highly-pressurized and supercooling refrigerant.

Then, the highly-pressurized and supercooling refrigerant flows into the capillary 65 and is depressurized to the temperature-lowered and depressurized refrigerant which in turn flows into the second external heat exchanger 62, and then the temperature-lowered and depressurized refrigerant flows into the second external heat exchanger 62 and is heat-exchanged by sucking heat from the target room, for thereby being evaporated to the temperature-lowered and depressurized refrigerant.

The temperature-lowered and depressurized refrigerant evaporated in and discharged from the second external heat exchanger 62 flows through the second four-directional valve 63 and temporarily stored therein, and then flows into the on/off compressor 61 for thereby being compressed to the temperature-raised and highly-pressure refrigerant.

Meanwhile, there may be provided more than two internal devices which are to be operated by the inverter compressor 51 or the on/off compressor 61.

As described above, in the air conditioning apparatus according to the present invention, a plurality of separately operable units are provided in the external device, so that the true performance of the internal devices can be closely matched to the initially installed capacity even during a simultaneous operation of the plurality of internal devices, for thereby significantly improving product efficiency.

Further, regardless of circumstances in which a unit is broken down, the rest of the units operates normally for thereby obtaining a product reliability.

What is claimed is:

1. An air conditioning apparatus including first second and third internal devices and an external device, wherein the external device comprises a plurality of separately operable units for operating different groups of said internal devices, at least one of said operable units being provided with a variable velocity compressor of an inverter type and at least one of said operable units being a constant velocity compressor of an on/off type wherein at least one of the operable units which is provided with a variable velocity compressor of an inverter type comprises:

an inverter compressor for compressing a refrigerant under a high temperature and a high pressure;

a first heat exchanger for heat-exchanging the refrigerant;

a first four-directional valve for discharging the high-temperature and highly-pressurized refrigerant discharged from the inverter compressor into the first external heat exchanger during a cooling operation, and being closed/opened so as to flow the high-temperature and highly-pressurized refrigerant into each of the first and second internal devices during a heating operation;

a check valve for switching on/off the flow of the highly-pressurized and supercooling refrigerant which was compressed after being heat-exchanged in the first external heat exchanger;

a first and second electronic expansion valve for depressurizing the highly-pressurized and supercooling refrigerant compressed after being heat-exchanged in the first external heat exchanger during the heating operation;

a third electronic expansion valve for heating and for further depressurizing the temperature-lowered refrigerant which was depressurized in the first and second electronic expansion valves during the cooling operation; and a first accumulator provided between the inverter compressor and the first four-directional valve and for temporarily storing therein, prior to being sent to the inverter compressor, the highly-pressurized and supercooling refrigerant which was heat-exchanged in the first and second internal devices during the cooling operation, and the highly-pressurized and supercooling refrigerant which was heat-exchanged in the first external heat exchanger during the heating operation.

2. An air conditioning apparatus including first, second and third internal devices and an external device wherein the external device comprises a plurality of separately operable units for operating different groups of said internal devices, at least one of said operable units being provided with a variable velocity compressor of an on/off type, at least one of the operable units being a constant velocity compressor of the on/off type comprises:

an on/off compressor for compressing the refrigerant under a high temperature and high pressure;

a second external heat exchanger for heat-exchanging the refrigerant;

a second four-directional valve for sending the high-temperature and highly-pressurized refrigerant compressed in and discharged from the on/off compressor into the second external heat exchanger during a cooling operation, and into the third internal device during a heating operation;

a second accumulator provided between the on/off compressor and the second four-directional valve and for temporarily storing therein, prior to sending to the on/off compressor, the highly-pressurized and supercooling refrigerant which was heat-exchanged in the third internal devices during the cooling operation, and the highly-pressurized and supercooling refrigerant which was heat-exchanged in the second external heat exchanger during the heating operation; and a capillary for depressurizing the highly-pressurized and supercooling refrigerant which was compressed after being heat-exchanged in the second external heat exchanger to the temperature-lowered and depressurized refrigerant.

* * * * *